United States Patent [19]

Baba et al.

[11] Patent Number: 4,486,820

[45] Date of Patent: Dec. 4, 1984

[54] LIGHTING EQUIPMENT WITH A SOLAR CELL

[75] Inventors: Yasushi Baba, Ikeda; Hirofumi Tezuka, Shiga; Kohzo Kitagawa, Yokaichi, all of Japan

[73] Assignee: Kyoto Ceramic Company Limited, Kyoto, Japan

[21] Appl. No.: 283,823

[22] Filed: Jul. 16, 1981

[30] Foreign Application Priority Data

Jul. 16, 1980 [JP] Japan .................................. 55-100503

[51] Int. Cl.³ .............................................. F21L 7/00
[52] U.S. Cl. ................................... 362/183; 362/157; 362/190; 362/276; 362/394; 362/395; 362/431; 362/802; 361/171; 136/244
[58] Field of Search ............... 362/157, 183, 190, 276, 362/394, 395, 431, 802; 361/173; 136/89 AL, 244

[56] References Cited

U.S. PATENT DOCUMENTS

| | | | |
|---|---|---|---|
| 3,979,656 | 9/1976 | Takeda | 362/183 |
| 4,200,904 | 4/1980 | Doan | 362/183 |
| 4,281,369 | 7/1981 | Batte | 362/183 |
| 4,319,310 | 3/1982 | Kingsley | 362/183 |

*Primary Examiner*—Donald P. Walsh
*Attorney, Agent, or Firm*—Spensley, Horn, Jubas & Lubitz

[57] ABSTRACT

A lighting equipment adapted for outdoor location, the equipment being supported on a structure on which a solar cell is placed to charge up a battery for lighting a lamp, wherein the battery and the lamp are provided in the structure, the lamp being lit from the sunset up to the expiry of a predetermined period of time.

6 Claims, 6 Drawing Figures

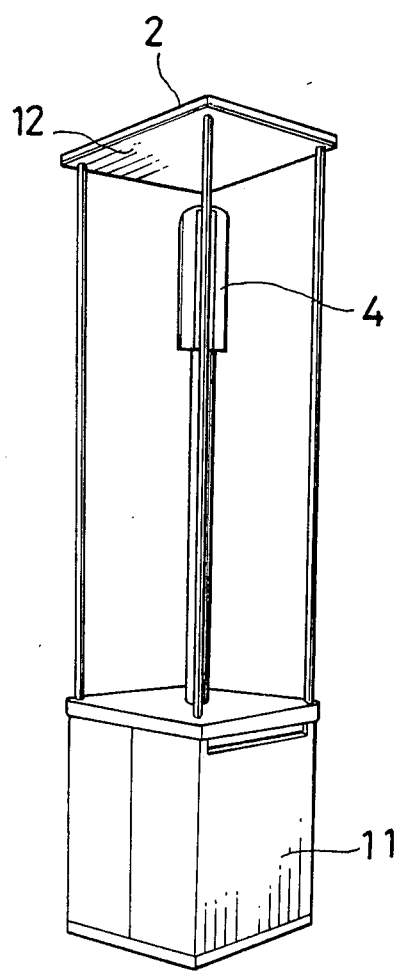
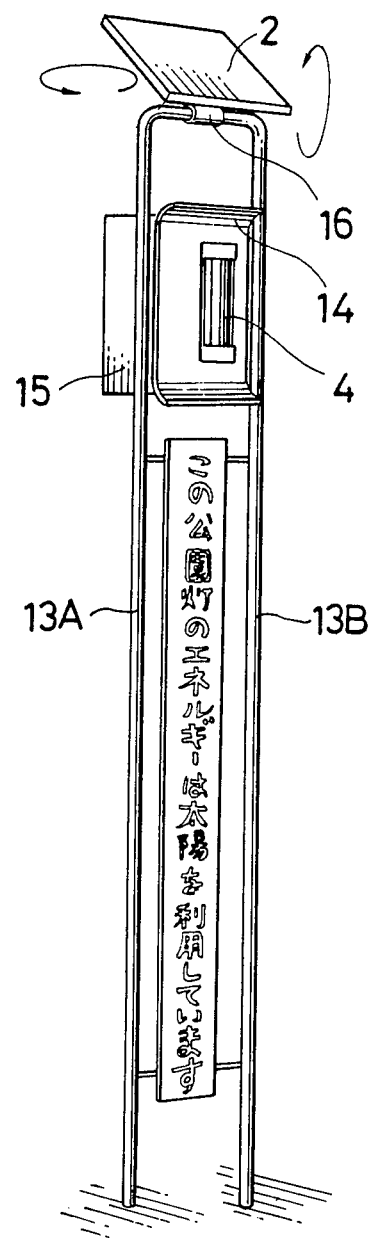

LIGHTING EQUIPMENT WITH A SOLAR CELL

BACKGROUND OF THE INVENTION

1. Field of the Invention

The present invention relates to a lighting equipment adapted for outdoor location, and more particularly, to a lighting equipment operable from a solar cell, the equipment being of the type which is adapted for outdoor use in public facilities, such as parks and gardens.

2. Description of the Prior Art

In general, the known outdoor lighting equipments are designed to operate on commercial power sources. For example, when the equipments are to be installed in a public park, electric cables must be embedded in the ground, and additionally, a control system including photoelectricity converting elements, Schmidt circuits, switching circuits and supply circuits, must be provided so as to control a current supply from the power source. To install such known lighting equipments, civil works are required often at the sacrifice of spoiling the scenic beauty of the parks. In addition, the employment of expensive cables are reflected in the costs.

The present invention aims at solving the problems pointed out above with respect to the known lighting equipments, and has for its object to provide an improved lighting equipment capable of being located at a place having no access to a commercial power source without the necessity for any civil and wiring works.

Another object of the present invention is to provide an improved lighting equipment capable of providing light even when the electric supply is cut off for some reason or other.

A further object of the present invention is to provide an improved lighting equipment capable of lighting for a predetermined period of time after sunset, and of automatically going out at midnights when pedestrians disappear in the parks and streets, thereby enabling a relatively small and cheap solar cell to be effectively used.

A still further object of the invention is to provide an improved lighting equipment in which the lamps are automatically lit and extinguished under the control system operable on an emf of a solar cell, thereby eliminating the necessity for having access to any other power supply.

Regardless of the advantages mentioned above it may happen that the battery is discharged below its full capacity because of the shortage of sunlight. This requires a routine watching service, and when necessary, recharging or replacing. This is troublesome and expensive.

It is therefore a further object of the present invention to provide an improved lighting equipment capable of using the energy of a battery without overdischarging the same, thereby avoiding recharging or replacing the battery.

Other objects and advantages of the present invention will become more apparent from the following description when taken in connection with the accompanying drawings which show, for the purpose of illustration only, preferred embodiments in accordance with the present invention.

SUMMARY OF THE INVENTION

According to one advantageous aspect of the present invention a lighting equipment includes a solar cell adapted to charge up a battery provided for lighting a lamp in response to the sunset, the lamp being lit during a predetermined period of time.

BRIEF DESCRIPTION OF THE DRAWINGS

FIG. 1 is a perspective view showing a lighting equipment of the present invention;

FIG. 2 is a perspective view showing an alternative embodiment;

DETAILED DESCRIPTION OF THE INVENTION

Figure 3:
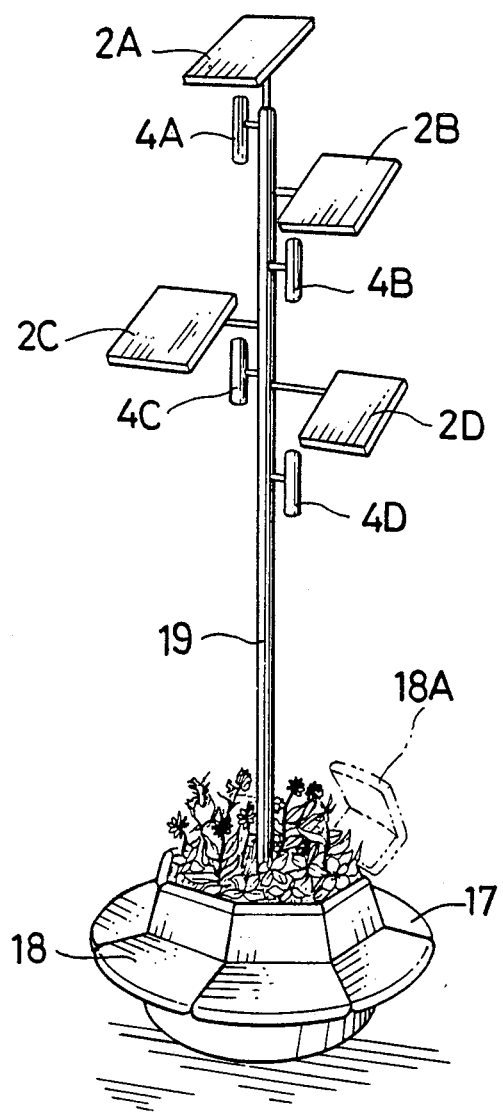
FIG. 3 is a perspective view showing a further modified version of the embodiment.

Referring to FIG. 1 the illustrated garden lighting equipment includes a base 11 in which a battery is housed, and a roof 12 having a solar cell 2 on its upper surface and a known fluorescent lamp 4 thereunder.

FIG. 2 shows an alternative embodiment especially for use in public parks. The letters appearing on the board supported by a pair of poles 13A and 13B proudly say that the equipment uses solar energy. The poles 13A and 13B also support a reflection board 14 whose top portion is slightly bent and protruded like eaves with the fluorescent lamp 4 on its surface and a battery box 15 on its back. The two poles 13A and 13B are jointed at 16 on which the solar cell 2 is rotatatively supported.

FIG. 3 shows a further modified version of the embodiment in the form usable as a bench. A battery box 17 constitutes a seat 18, and supports a pole 19 in an erect manner, along which pole 19 four solar cells 2A to 2D and four fluorescent lamps 4A to 4D are supported in zig-zag. The seat 18 has a removable portion 18A through which a battery is loaded or unloaded.

Figure 4:
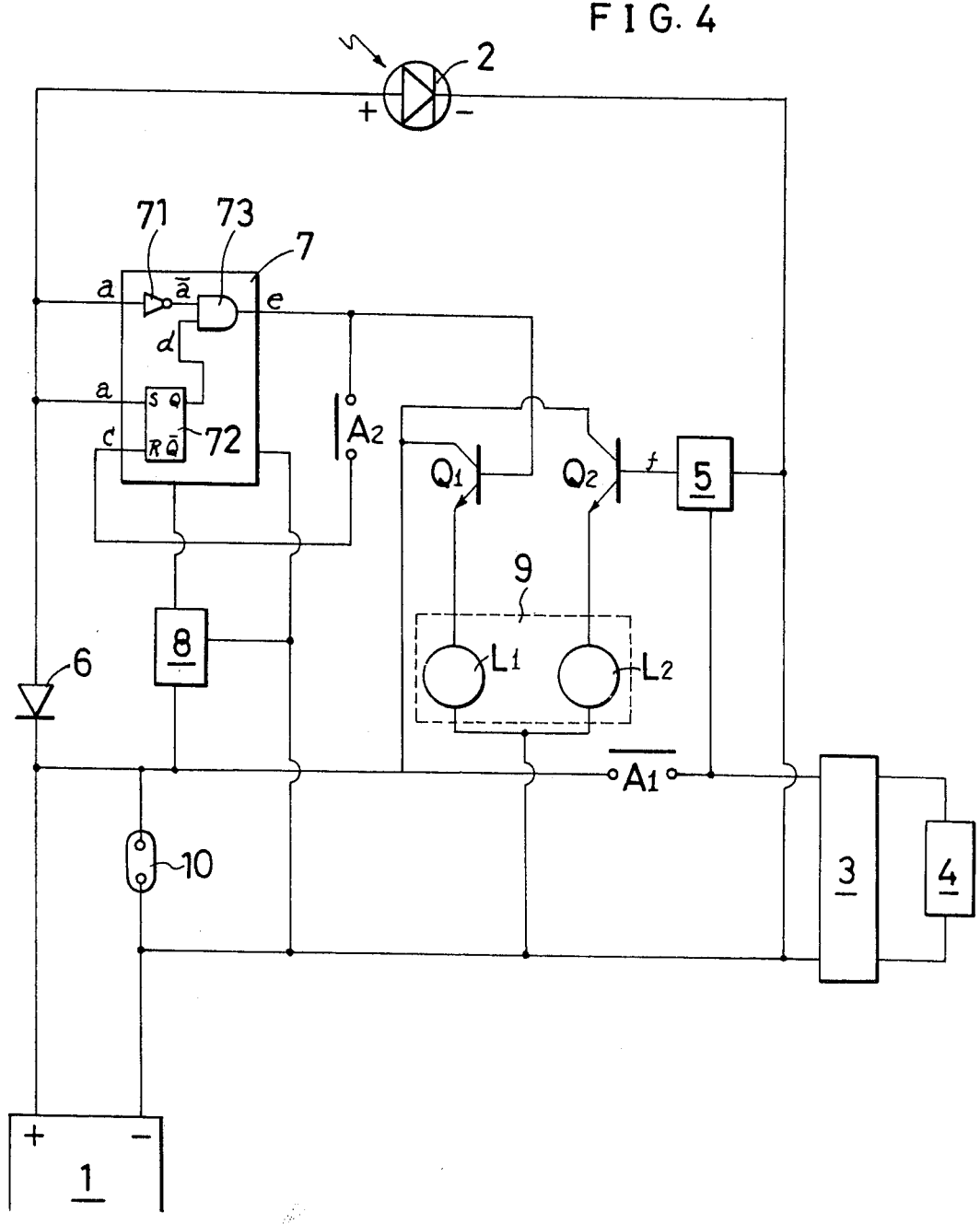
FIG. 4 is an electric diagram.

Referring to FIG. 4 an electric circuit will be explained:

A battery 1 is charged with electrical energy from the solar cell 2 via a diode 6, which is adapted to prevent a reverse electrical flow. An inverter 3 converts a d.c. current from the battery 1 into a high voltage a.c. current for lighting the lamp 4. For the lamp 4 a fluorescent lamp, a low-pressure sodium lamp, a low pressure mercury lamp, an incadescent lamp and any other known lamp can be employed. The inverter 3 can be omitted, depending upon the type.

A logical operation circuit 7 includes a NOT circuit 71 adapted to invert an output voltage (a) of the solar cell 2 into $(\bar{a})$, an RS flip-flop 72 switchable when the output voltage (a) of the solar cell 2 is at high level and reset by a reset signal (c), and an AND gate 73 whose input only relies on an output (d) of the flip-flop 72 when the same is at "1" and an inverted signal $(\bar{a})$.

The logical operation circuit 7 is supplied with a d.c. power from the battery 1 via a constant-voltage circuit 8. The output of the AND-gate 73 is a sunset signal, which is fed back to the reset input of the flip-flop 72 via a contact $A_2$.

A switch controller includes a keep relay 9, a first transistor $Q_1$ driven by the sunset signal (e), and a second transistor $Q_2$ driven by an output signal (f) of a timer 5.

The keep relay 9 includes a make coil $L_1$, a break coil $L_2$ and contacts $A_1$ and $A_2$. The first transistor $Q_1$ controls the exciting current for the make coil $L_1$, and the second transistor $Q_2$ controls the exciting current for the break coil $L_2$. The contact $A_1$ controls the current supply from the battery 1 to the inverter 3. The timer 5 produces desired output signals (f) a predetermined period of time after it is supplied with a driving power from the load of the contact $A_1$. The reference numeral 10 designates terminals for external connection to a portable radio, a loud speaker and so forth.

Figure 6:
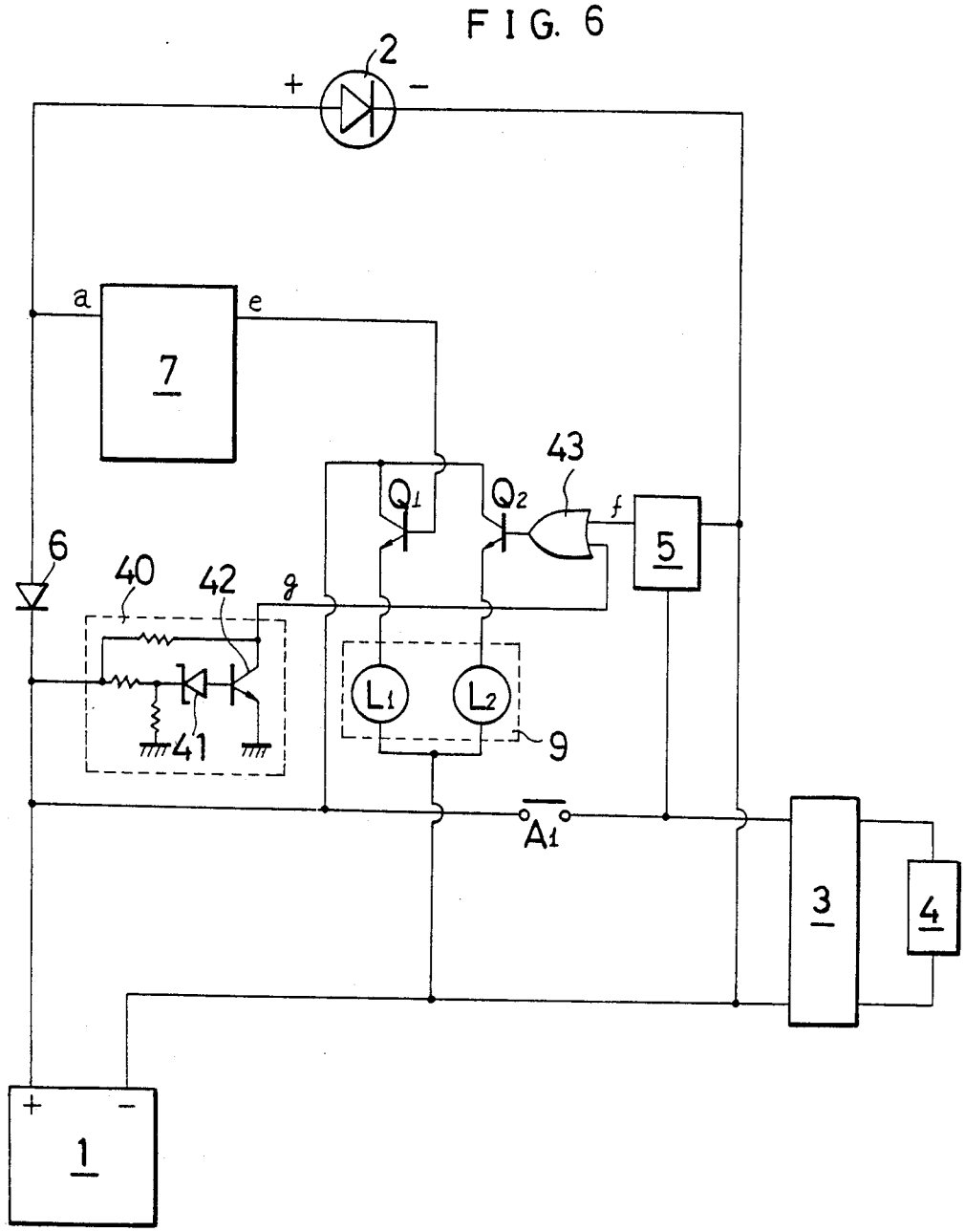
FIG. 6 is an electric diagram showing a modified version of the circuit incorporated in the present invention.

FIG. 6 shows a further alternative embodiment which is particularly designed so as to prevent the battery 1 from becoming overdischarged. The battery 1 is provided with an extra circuit 40 at its positive terminal, which circuit is adapted to prevent the battery 1 from being overdischarged. The circuit 40 includes a Zener diode 41, a transistor 42 and an output terminal(g). When the voltage at the battery 1 is higher than the required value, the base of the transistor 42 is, in spite of a voltage drop at the Zener diode 41, maintained at a sufficient potential to keep the same on, but when the voltage at the battery 1 falls below the required value, the transistor 42 goes off.

When the transistor 42 is on, the output terminal (g) of the circuit 40 is at a low potential, but when it is off, its potential goes high, thereby driving the OR-gate 43 to energize the second transistor $Q_2$. Thus the break coil $L_2$ for the keep relay 9 is excited to close the contact $A_1$.

Figure 5:
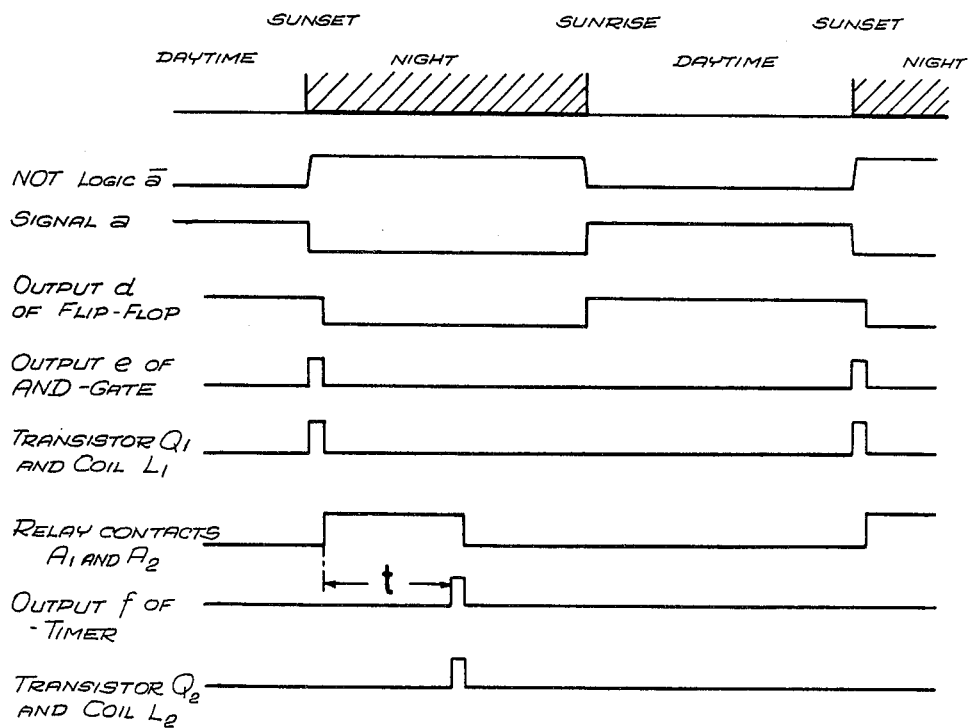
FIG. 5 is a timing diagram showing the sequence of operation of elements of the circuit shown in FIG. 4.

Referring to FIG. 5, a typical example of the operation will be explained:

In the daytime, even if it is cloudy or raining, the solar cell 2 receives sunlight to some extent, so that the input signal (a) of the logical operation circuit 7 is at high level. Accordingly, the (ā) is maintained "0", thereby keeping the AND-gate 73 closed. Likewise, the setting signal (b) for the flip-flop 72 is at high level, and the output (d) thereof is "1", which means that the flip-flop 72 stands by for sunset. When the ground is sunlit with no substantial cloud to the extent that the output voltage of the solar cell 2 is higher than that of the battery 1, the battery 1 is charged through the diode 6.

When after sunset it is getting dark, the NOT circuit 71 has an output (ā) of "1", and the AND-gate 73 has an output (e) of "1", thereby energizing the first transistor $Q_1$ to excite the make coil $L_1$ for the keep relay 9. Thus the contacts $A_1$ and $A_2$ are closed. With the contact $A_1$ being closed, the fluorescent lamp 4 is lit, and at the same time the timer 5 is started. After the set period of time, for example 6 hours, has passed, the output (f) of the timer 5 is converted from a low level to a high level, thereby energizing the second transistor $Q_2$ to excite the break coil $L_2$ for the keep relay 9. Thus the contacts $A_1$ and $A_2$ are opened. With the contact $A_2$ being opened, the flip-flop 72 is reset, and the AND-gate 73 is closed, so that the sunset signal (e) becomes a trigger, which is only effective during a time lag occurring in the contact. This means that the energizing of the first transistor $Q_1$ continues momentarily. Likewise, the energizing of the second transistor $Q_2$ immediately ceases as the timer 5 is deenergized because of the exciting of the break coil $L_2$. In this way the electrical energy is economically used in the whole controlling system with the use of solar energy.

Under the climatic conditions of Japan it has been demonstrated that under the system of the invention a 4 W fluorescent lamp can be lit for 6 hours with the use of a solar cell of 16 V, 12 W and a battery of 12 V, 90 AH.

What is claimed is:

1. An outdoor lighting equipment to light a lamp with the power source obtained from a solar cell provided therein, the outdoor lighting equipment comprising:
    a battery for storing the electric energy converted from solar energy by said solar cell;
    a first circuit connecting between said battery and said solar cell so as to charge up said battery under a potential difference therebetween;
    a second circuit allowing a current to flow from said battery to light said lamp;
    a power switch for opening and closing the path of said current from said battery to said lamp;
    a logical operation circuit adapted to produce a sunset signal in response to a voltage drop taking place in said solar cell because of the shortage of sunlight;
    a timer adapted to set a period of time during which said current from said battery to said lamp is kept flowing, said timer being driven by said current, and outputting a switching-off signal to make said power switch turn off at the expiration of said period of time; and
    overdischarge preventing means for preventing the battery from overdischarging during extended periods of cloudy weather comprising a voltage drop detector for detecting a drop in the terminal voltage of said battery below a predetermined value and providing a low voltage signal in response to said detection, whereby said battery is protected against becoming overdischarged by supplying a current beyond its capacity;
    control means for turning on said power switch in response to said sunset signal and turning off said power switch in response to said switching off signal or said low voltage signal.

2. An outdoor lighting equipment as defined in claim 5, wherein said control means includes a keep relay having a make coil for turning on said power switch; a break coil for turning off said power switch; a first transistor adapted to control an exciting current for said make coil; and a second transistor adapted to control an exciting current for said break coil said first transistor being driven by said sunset signal produced in said logical operation circuit, and said second transistor being driven by, said switching off signal or said low voltage signal.

3. An outdoor lighting equipment as defined in claim 2, wherein said keep relay is provided with a contact being used to constitute a feed-back circuit adapted to reset the memory of sunset condition in said logical operation circuit, whereby said exciting current for said make coil is immediately cut off in response to the resetting of said logical operation circuit.

4. An outdoor lighting system having a lamp, a battery for providing current to light said lamp, and a solar energy cell connected to said battery for recharging said battery, the improvement comprising providing a selective lamp activation circuit including:
    means responsive to the output voltage of the solar cell for providing a sunset signal in response to a drop in the level of said output voltage below a predetermined level;
    make means responsive to said sunset signal for producing a switch closing signal in response to said sunset signal;

first switch means for providing current flow to the lamp from the battery in response to said switch closing signal;

timer means powered by said current flow for providing a time elapsed signal a fixed period of time after activation of said current flow;

means for preventing overdischarging of said battery including means responsive to the voltage of said battery for providing an overdischarge signal when said voltage drops below a predetermined value; and break means responsive to said time elapsed signal and said overdischarge signal for providing a switch opening signal upon receipt of either said time elapsed signal or said overdischarge signal;

wherein said first switch means terminates said current flow in response to said switch opening signal.

5. The outdoor lighting system of claim 4 further comprising second switch means for providing a reset signal to said sunset signal providing means in response to said switch closing signal and wherein said sunset signal providing means comprises:

inverting means for inverting the output voltage level from the solar cell to produce a high voltage level signal when the output voltage of the solar cell is low and a low output voltage level signal when said output voltage is high;

storage means for storing a signal corresponding to the output voltage level of the solar cell and outputting a stored signal corresponding thereto until receipt of a reset signal; and logical AND operation means for receiving the output from said inverting means and said storage means and producing a sunset signal when both said outputs are at a high level.

6. A circuit for providing selective activation and deactivation of a lamp powered by a solar energy cell charged battery in response to changes in lighting as sensed by the solar energy cell comprising:

means for providing a first signal representative of the output of the solar energy cell and having a first level during daylight hours and a second level during nighttime hours;

means for storing said first signal until receipt of a reset pulse;

means for inverting said first signal;

means for providing a sunset signal when said inverted first signal and said stored first signal are both at said first level; and control means for receiving said sunset signal and in response to said sunset signal allowing current flow from the battery to the lamp and applying a reset signal to said storage means, said control means further including timing means activated by said current flow for terminating said current flow a specified period of time after commencement of said current flow.

* * * * *